US008656446B2

(12) United States Patent
Barton et al.

(10) Patent No.: US 8,656,446 B2
(45) Date of Patent: *Feb. 18, 2014

(54) SYSTEM AND METHOD FOR INTERNET ACCESS TO A PERSONAL TELEVISION SERVICE

(75) Inventors: James M. Barton, Alviso, CA (US); David C. Platt, Mountain View, CA (US)

(73) Assignee: TiVo Inc., Alviso, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/945,753

(22) Filed: Nov. 12, 2010

(65) Prior Publication Data

US 2011/0061071 A1    Mar. 10, 2011

Related U.S. Application Data

(63) Continuation of application No. 10/220,558, filed as application No. PCT/US01/06313 on Feb. 27, 2001, now Pat. No. 7,908,635.

(60) Provisional application No. 60/186,551, filed on Mar. 2, 2000.

(51) Int. Cl.
*H04N 7/173* (2011.01)

(52) U.S. Cl.
USPC ........... 725/134; 725/105; 725/110; 725/114; 725/115

(58) Field of Classification Search
USPC ......... 725/37, 74, 80, 85, 105, 109, 110, 131, 725/133, 134, 139, 141, 142, 151, 153; 386/362
See application file for complete search history.

(56) References Cited

U.S. PATENT DOCUMENTS 5,371,794 A    12/1994 Diffie et al.
5,721,827 A *  2/1998 Logan et al. ............ 709/217
(Continued)

FOREIGN PATENT DOCUMENTS

DE    197 40 079    9/1997
EP    854 645    7/1998
(Continued)

OTHER PUBLICATIONS

U.S. Appl. No. 10/220,558, filed Aug. 29, 2002, Notice of Allowance, Nov. 8, 2010.

(Continued)

*Primary Examiner* — John Schnurr
(74) *Attorney, Agent, or Firm* — Hickman Palermo Truong Becker Bingham Wong LLP; Karl T. Rees

(57) ABSTRACT

A communication system and a family of methods for remote access to personal television service are disclosed. According to this invention, a remote personal TV service center provides centralized program guide information. A user may access to the personal TV service center through a digital video recorder which is connected to the personal TV service center via telephone modem or a network server. A user may access to the personal TV service center through a remote computer terminal or a personal digital assistant which is connected to a computer network. The user selects program events and programs the digital video recorder by using a graphical user interface installed in the front panel of the digital video recorder in case of local programming, or using a similar GUI which is incorporated into the Web pages presented to remote users by a Web server in case of remote programming. The media stream stored in one digital video recorder may be transferred to another digital video recorder. For data security protection during data transfer, all communication are authenticated and encrypted.

75 Claims, 8 Drawing Sheets

(56) References Cited

U.S. PATENT DOCUMENTS

| | | |
|---|---|---|
| 5,883,901 A | 3/1999 | Chiu et al. |
| 5,896,566 A | 4/1999 | Averbuch et al. |
| 5,963,909 A | 10/1999 | Warren et al. |
| 5,990,884 A | 11/1999 | Douma et al. |
| 6,025,868 A | 2/2000 | Russo |
| 6,040,851 A | 3/2000 | Cheng et al. |
| 6,065,050 A | 5/2000 | DeMoney |
| 6,092,201 A | 7/2000 | Turnbull et al. |
| 6,166,730 A | 12/2000 | Goode et al. |
| 6,247,176 B1 | 6/2001 | Schein et al. |
| 6,260,142 B1 | 7/2001 | Thakkar et al. |
| 6,269,099 B1 | 7/2001 | Borella et al. |
| 6,351,538 B1 | 2/2002 | Uz |
| 6,442,328 B1 | 8/2002 | Elliott et al. |
| 6,463,444 B1 | 10/2002 | Jain et al. |
| 6,751,321 B1 | 6/2004 | Kato et al. |
| 6,754,885 B1 | 6/2004 | Dardinski et al. |
| 6,917,610 B1 | 7/2005 | Kung et al. |
| 6,959,221 B1 | 10/2005 | Kataoka |
| 6,972,786 B1 | 12/2005 | Ludwig |
| 6,981,147 B1 | 12/2005 | Hamann et al. |
| 7,113,994 B1 | 9/2006 | Swift et al. |
| 7,188,087 B1 | 3/2007 | Goldstein |
| 7,260,715 B1 | 8/2007 | Pasieka |
| 2001/0014206 A1 | 8/2001 | Artigalas et al. |
| 2002/0044656 A1 | 4/2002 | Candelore |
| 2002/0054752 A1* | 5/2002 | Wood et al. ............ 386/83 |
| 2002/0059363 A1 | 5/2002 | Katz et al. |
| 2002/0100052 A1 | 7/2002 | Daniels |
| 2002/0147686 A1 | 10/2002 | Safadi et al. |
| 2002/0164156 A1 | 11/2002 | Bilbrey |
| 2003/0033606 A1 | 2/2003 | Puente et al. |
| 2003/0066093 A1 | 4/2003 | Cruz-Rivera et al. |
| 2003/0093790 A1 | 5/2003 | Logan et al. |
| 2003/0097338 A1 | 5/2003 | Mankovich et al. |
| 2003/0122922 A1 | 7/2003 | Saffer et al. |
| 2003/0188153 A1 | 10/2003 | Demoff et al. |
| 2003/0217328 A1 | 11/2003 | Agassi et al. |
| 2004/0109675 A1 | 6/2004 | Tsukidate |
| 2004/0237104 A1 | 11/2004 | Cooper et al. |
| 2004/0243815 A1 | 12/2004 | Tsukamura |
| 2005/0028208 A1 | 2/2005 | Ellis et al. |
| 2005/0055730 A1 | 3/2005 | Daniels |
| 2005/0108519 A1 | 5/2005 | Barton et al. |
| 2005/0108769 A1 | 5/2005 | Arnold et al. |
| 2005/0216942 A1 | 9/2005 | Barton |
| 2005/0289591 A1 | 12/2005 | Vermola et al. |

FOREIGN PATENT DOCUMENTS

| | | |
|---|---|---|
| EP | 909 094 | 4/1999 |
| EP | 0 987 888 A1 | 10/1999 |
| EP | 0 977 200 A1 | 2/2000 |
| EP | A 977200 | 2/2000 |
| EP | A 0987888 | 3/2000 |
| EP | 1 079 628 | 2/2001 |
| EP | 1 102 481 | 5/2001 |
| EP | 2 180 706 A2 | 12/2004 |
| JP | 11242686 | 9/1999 |
| JP | 11-346166 | 12/1999 |
| JP | 2003-525550 A | 9/2001 |
| JP | 2003-526291 A | 9/2001 |
| JP | 2002-222138 A | 8/2002 |
| JP | 2003-108371 A | 4/2003 |
| JP | 2003 141031 A | 5/2003 |
| WO | WO 97/13368 | 4/1997 |
| WO | WO 98/10589 | 3/1998 |
| WO | WO 99/52278 | 10/1999 |
| WO | WO A 99/52278 | 10/1999 |
| WO | WO 99/65237 | 12/1999 |
| WO | WO 00/01149 | 1/2000 |
| WO | WO 00/04549 | 1/2000 |
| WO | WO A 00/04549 | 1/2000 |
| WO | WO 00/07368 | 2/2000 |
| WO | WO 00/08849 | 2/2000 |
| WO | WO 00/75925 | 12/2000 |
| WO | WO 00/76217 | 12/2000 |
| WO | WO 01/10127 A1 | 2/2001 |
| WO | WO 01/33427 | 5/2001 |
| WO | WO 01/65862 A2 | 9/2001 |
| WO | WO 01/67756 A2 | 9/2001 |
| WO | WO 02/43353 A2 | 5/2002 |

OTHER PUBLICATIONS

U.S. Appl. No. 11/105,032, filed Apr. 12, 2005, Notice of Publication, Sep. 29, 2005.

U.S. Appl. No. 11/105,032, filed Apr. 12, 2005, Non-Final Office Action, Jun. 22, 2009.

U.S. Appl. No. 11/105,032, filed Apr. 12, 2005, Final Office Action, Dec. 30, 2009.

U.S. Appl. No. 11/105,032, filed Apr. 12, 2005, Non-Final Office Action, Mar. 23, 2011.

U.S. Appl. No. 11/105,032, filed Apr. 12, 2005, Final Office Action, Oct. 25, 2011.

U.S. Appl. No. 10/741,596, filed Dec. 18, 2003, Final Office Action, Dec. 9, 2010.

U.S. Appl. No. 10/741,596, filed Dec. 18, 2003, Final Office Action, Sep. 2, 2011.

U.S. Appl. No. 10/741,596, filed Dec. 18, 2003, Non-Final Office Action, Oct. 15, 2008.

U.S. Appl. No. 10/741,596, filed Dec. 18, 2003, Non-Final Office Action, Apr. 13, 2011.

U.S. Appl. No. 10/741,596, filed Dec. 18, 2003, Non-Final Office Action, Feb. 1, 2012.

U.S. Appl. No. 10/741,596, filed Dec. 18, 2003, Restriction, Jun. 3, 2008.

U.S. Appl. No. 10/741,596, filed Dec. 18, 2003, Notice of Publication, May 19, 2005.

U.S. Appl. No. 10/741,596, filed Dec. 18, 2003, Final Office Action, Jan. 27, 2010.

U.S. Appl. No. 10/741,596, filed Dec. 18, 2003, Non-Final Office Action, Apr. 27, 2009.

U.S. Appl. No. 10/741,596, filed Dec. 18, 2003, Non-Final Office Action, Jul. 2, 2010.

International Searching Authority, "Notification of Transmittal of the International Search Report and the Written Opinion of the International Searching Authority, or the Declaration," PCT/US04/42212 dated Jan. 31, 2007 (9 pages).

Current Claims, PCT/US04/42212, 5 pages.

Official Action from CN for foreign patent application No. 200510052755.7 dated Jul. 20, 2007 (6 pages).

Current Claims in CN patent application No. 200510052755.7 (2 pages).

Official Action from EPO for foreign patent application No. 01913128.3-1241 dated Dec. 6, 2006 (7 pages).

Current Claims in EPO patent application No. 01913128.3-1241 (13 pages).

Office Action from EPO for foreign patent application No. 04 814 401.8-1241 dated Mar. 13, 2008 (6 pages).

Current claims in EPO patent application No. 04 814 401.8-1241 (3 pages).

Australian Patent Office, "Examination Report", Application No. SG 200604127-1, dated Jun. 2, 2008 (4 pages).

Claims, Application No. SG 200604127-1, dated Jun. 2, 2008 (9 pages).

State Intellectual Property Office of P.R.C., "Notification of the First Office Action", Application No. 200480038102.7, received Mar. 18, 2009 (8 pages).

Claims, Application No. 200480038102.7 (6 pages).

Australian Patent Office, "Written Opinion", application No. SG 200603866-5, received Mar. 16, 2009 (5 pages).

Claims, application No. SG 200603866-5 (6 pages).

European Patent Office, "Communication Pursuant to Article 94(3) EPC", Application No. 01913128-3-1241, dated Oct. 7, 2009 (7 pages).

(56) References Cited

OTHER PUBLICATIONS

Claims, Application No. 01913128-3-1241 (5 pages).
JPO, Official Notice for Preliminary Rejection (translation), application No. 2006-545415, dated Apr. 23, 2010 (4 pages).
Current Claims, application No. 2006-545415 (7 pages).
Japanese Office Action received in 2001-563543 dated Aug. 6, 2010 (5 pages).
Japanese Office Action received in 2001-563543 dated Jan. 18, 2011 (5 pages).
Japanese Office Action received in 2001-563543 dated Sep. 13, 2011 (4 pages).
Japanese Office Action received in 2001-563543 dated Apr. 17, 2012 (5 pages).
Japanese Current Claims of 2001-563543 dated Jan. 2012 (4 pages).
European Office Action received in 01913128.3 dated Sep. 12, 2011 (6 pages).
European Office Action received in 01913128.3 dated Jan. 9, 2012 (3 pages).
European Current Claims of 01913128.3 dated Dec. 2011 (5 pages).
U.S. Appl. No. 13/079,326, filed Apr. 4, 2011, Office Action, Aug. 22, 2012.
European Patent Office, Office Action, in Application No. 10153517.7-1241, Dated Aug. 31, 2012, 9 pages.
Current Claims in application No. 10153517.7-1241, dated Feb. 12, 2010, 4 pages.
European Patent Office, Office Action in Application No. 10180631.3-1241, dated Aug. 31, 2012, 8 pages.
Current Claims in application No. 10180631.3-1241, dated Sep. 28, 2010, 2 pages.
European Patent Office, "Office Action" in application No. 09 702 115.8-2224, dated Jun. 2, 2013, 8 pages.
Current Claims in application No. 09 702 115.8-2224, dated Jun. 2013, 4 pages.
European Patent Office, "Office Action" in application No. 10 180 631.3-1905, dated Jun. 19, 2013, 7 pages.
Current Claims in application No. 10 180 631.3-1905, dated Jun. 2013, 2 pages.
European Patent Office, "Office Action", in application No. 04 814 400.0-1903, dated Sep. 6, 2013, 5 pages.
Current Claims in application No. 04 814 400.0-1903, dated Jul. 4, 2012, 4 pages.
U.S. Appl. No. 10/741,596, filed Dec. 18, 2003, Final Office Action, Oct. 11, 2013.

\* cited by examiner

SYSTEM AND METHOD FOR INTERNET ACCESS TO A PERSONAL TELEVISION SERVICE

CROSS-REFERENCE TO RELATED APPLICATIONS

Benefit Claim

This application claims benefit as a Continuation of application Ser. No. 10/220,558, filed Aug. 29, 2002, now U.S. Pat. No. 7,908,635, the entire contents of which is hereby incorporated by reference as if fully set forth herein, under 35 U.S.C. §120. Application Ser. No. 10/220,558 is a national phase application of PCT/US01/06313 filed on Feb. 27, 2001, which claims priority to U.S. Provisional Appln. Ser. No. 60/186,551 filed on Mar. 2, 2000. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The invention relates to personal television service. More particularly, the invention relates to a communication system and methods for remote access to centralized personal television service via direct telephone connection or indirect network connection.

BACKGROUND

With the advent of videocassette recorders (VCRs), TV viewers are able to record TV program events that are broadcasted in a given time slot and playback the recorded program content later. During the recording, a VCR changes the electrical signals of a program content into magnetic signals and stores the magnetic signals on magnetic tape. When playing back, the VCR changes magnetic signals into electrical signals and the attached TV set displays the program content of the signals on its screen.

With the development of digital technology, the VCRs are being superseded by digital video recorders (DVRs). Like a VCR, the functionality of a DVR is to record broadcasted program events and playback later. During recording, a DVR changes the electrical signals of a program content into digital information, such as MPEG data streams and stores the digital information in a memory device or directly stores the pre-digitized TV signals in the memory. When playing back, the DVR changes the digital information back to analog signals and the attached TV set displays the program content of the signals on its screen.

To record TV program events using a VCR, a TV viewer must manually select a channel and control the VCR or have somebody else to do it. By using a DVR, however, the TV viewer may establish a program recording sequence by programming the DVR according to a TV program guide and have the recording done automatically.

Although the DVR enables users to specify the recording time, channel, and duration for a plurality of events, it cannot meet the increasing needs in defining and capturing the program events in a more intelligent way. For instance, in situations where a user cannot find a TV program guide or he is far away from his DVR and TV set, he will be unable to program his DVR and record the program events that he likes.

What is desired is to establish a communication system through which a TV viewer may access to a centralized TV program guide database and program his DVR anywhere.

SUMMARY

A communication system and methods for remote access to a centralized personal television service are disclosed. According to this invention, a personal TV service center provides centralized program guide information. A user may access the personal TV service center through a digital video recorder which is connected to the personal TV service center via telephone modem or a network server. A user may also access the personal TV service center through a remote computer terminal or a personal digital assistant which is connected to the personal TV service center via a computer network such as the Internet.

In case of local programming, a user selects program events by using a graphical user interface installed in the front panel of the DVR. For remote programming, the user selects program events and programs the DVR by using a similar graphic interface which is incorporated into the Web pages presented to remote users by the personal TV service center's Web server. To use the personal TV service more efficiently, two or more DVRs may be connected, either by direct connection or over a network such as the Internet, so that recorded media stream may be transferred from one DVR to another.

DETAILED DESCRIPTION

Figure 1:
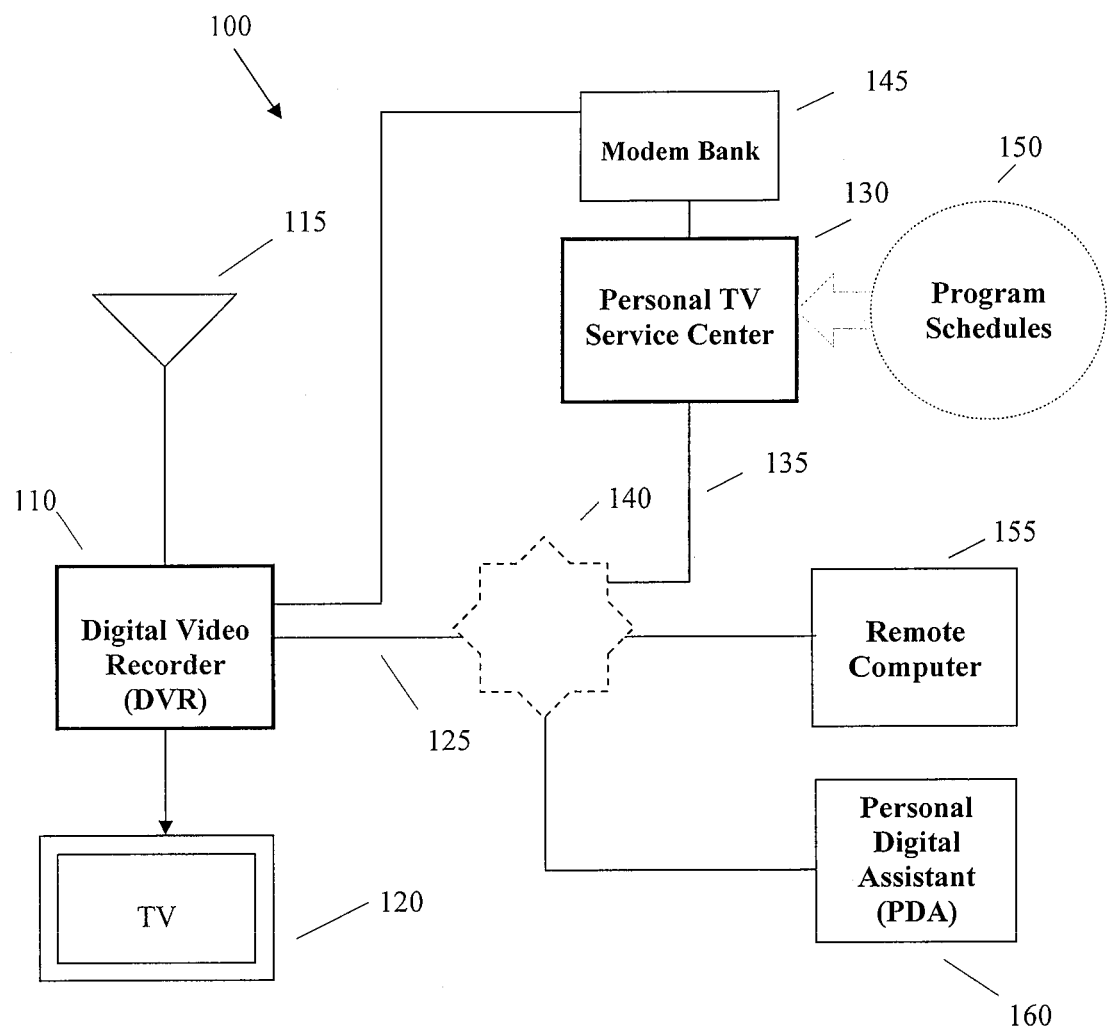
FIG. 1 is a block diagram illustrating a communication system for remote access to a centralized personal television service according to the invention.

In the following detailed description of the invention, some specific details are set forth to provide a thorough understanding of the presently preferred embodiment of the invention. However, it will be apparent to those skilled in the art that the invention may be practiced in embodiments that do not use the specific details set forth herein. Well known methods, procedures, components, and circuitry have not been described in detail.

In the following discussion, in references to the drawings like numerals refer to like parts throughout the several views.
A. System for Remote Access to Personal TV Service Referring to FIG. 1, a communication system for remote access to a personal TV service is shown, generally designated as 100. In accordance with the present invention, a digital video recorder (hereinafter as DVR) 110 installed in a household communicates with a personal TV service center (hereinafter as service center) 130, which provides program guide data, graphical resources (such as fonts, pictures, etc.), service information, and other forms of data that enable the DVR 110 to operate independently of the service center 130 to satisfy viewer interests. This communication uses a secure distribution architecture to transfer data between the DVR 110 and the service center 130 such that both the service data and the user's privacy are protected. The DVR 110 receives broadcast signals from an antenna 115 or receives television signals from a cable TV system.

In one embodiment of the invention, the DVR 110 generally comprises: a plurality of components that are necessary to digitize an analog television signal and convert it into a digital data stream; a plurality of components that are designed to record segments of said data stream; a plurality of storage facilities that are designed to retain segments of said data stream; a plurality of components that are designed to retrieve segments of said data stream, convert the said data stream into an analog signal, and then modulate the signal onto a RF carrier, through which the signal is delivered to a standard TV set 120; and an interface 125, through which the DVR 110 communicates with a network 140.

The DVR 110 may be directly connected to the service center 130 by using its internal telephone modem to dial into an incoming call modem bank 145. The incoming call is first routed to the service center 130 for identification verification. Upon verification, the incoming call is authorized. The private modem bank 145 answers the call and the DVR 110 is granted access to the databases in the service center 130.

Alternatively, the DVR 110 may be indirectly connected to the service center 130 via the network 140. The interface 125 between the DVR 110 and the network 140 may be the internal telephone modem of the DVR 110, or a dedicated network interface such as a cable modem. The computer network 140 can be either a private network or the Internet. The DVR 110 initiates a connection to the computer network 140 by calling a local access telephone number for an Internet service provider (ISP). The ISP directs the network connection request to the service center 130 for identification verification. Upon verification, the network connection is authorized and the DVR 110 is granted access to the databases in the service center 130.

The service center 130 receives program schedule information 150 from external sources. The program schedule information 150 forms the basis of a program guide that TV viewers can use to select TV programs to be recorded. The service center 130 communicates with the computer network 140 through an interface 135.

TV viewers can use remote computer 155 or personal digital assistants 160 to remotely access the program database in the service center 130 by establishing a communication channel with the service center 130 via the computer network 140.

Figure 2:
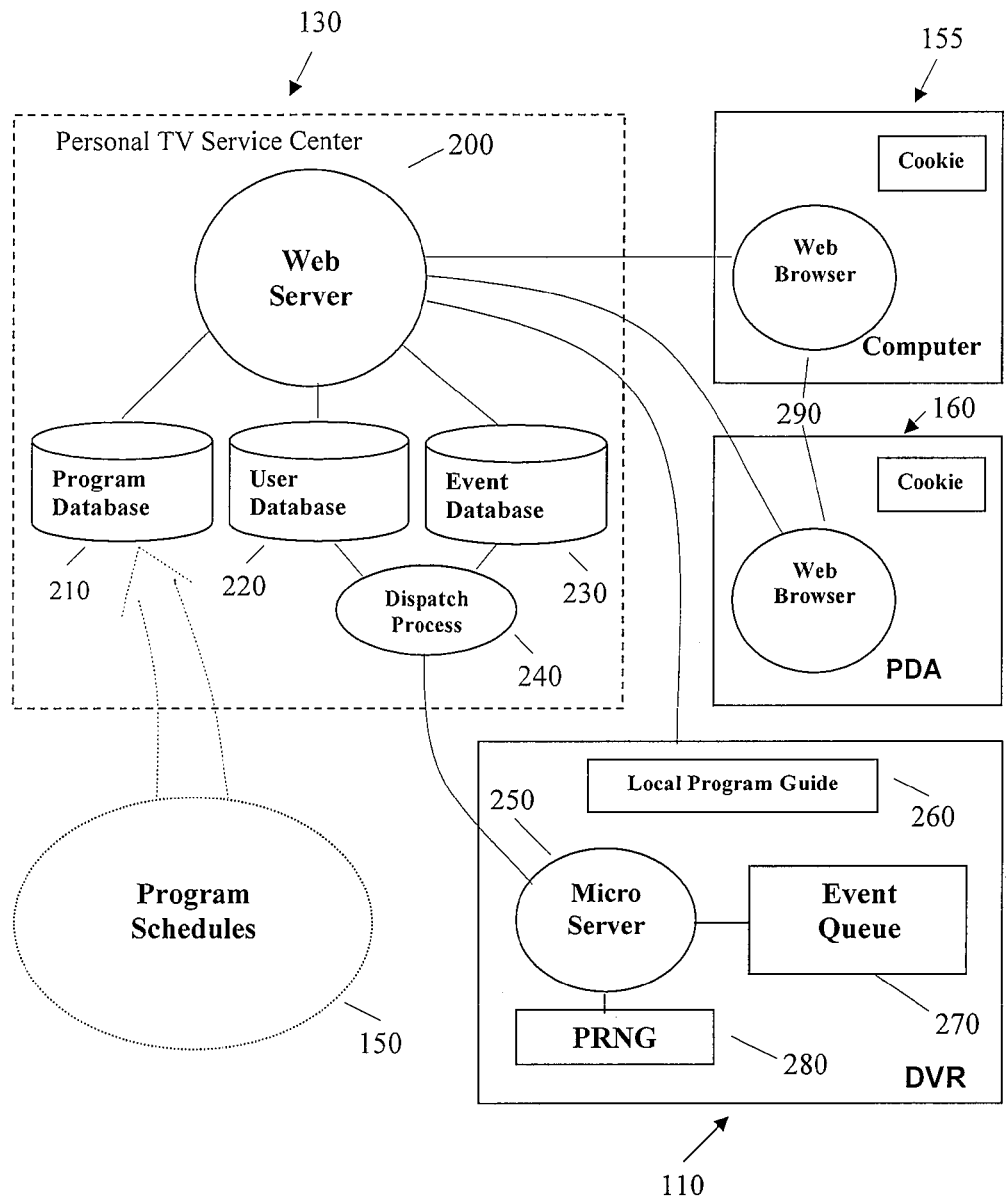
FIG. 2 is a data flow diagram showing the operational processes of the system shown in FIG. 1.

Referring to FIG. 2, the service center 130 includes a Web server 200, which collects, organizes, and provides program schedule information; a program database 210, which stores program schedule information; a user database 220, which stores information about users and digital video recorders; an event database 230, which stores an event list for each user, and a dispatch process 240, which traverses the user database and retrieves the event list from the event database. It may also include a network interface over which the Web server and the digital video recorder communicate.

In the preferred embodiment, the DVR 110 includes a micro-server 250, which controls the communication between the DVR 110 and the service center 130; a local program storage guide 260, which records the program guide provided by the service center 130 and is updated whenever the DVR 110 accesses the service center 130; an event queue 270, which is a data structure used to initiate recording sessions that capture selected TV programs; a pseudo-random-number-generator (PRNG) 280, which generates authorization key for remote access; as well as a network interface 125, which connects the DVR 110 to the computer network 140. The event queue 270 is coupled to a recording device integral to the DVR 110.

Both the remote computer 155 and the personal digital assistants (PDA) 160 comprises a Web browser 290, which may be a generic Web browser that enables the user to view Web pages.

Figure 3:
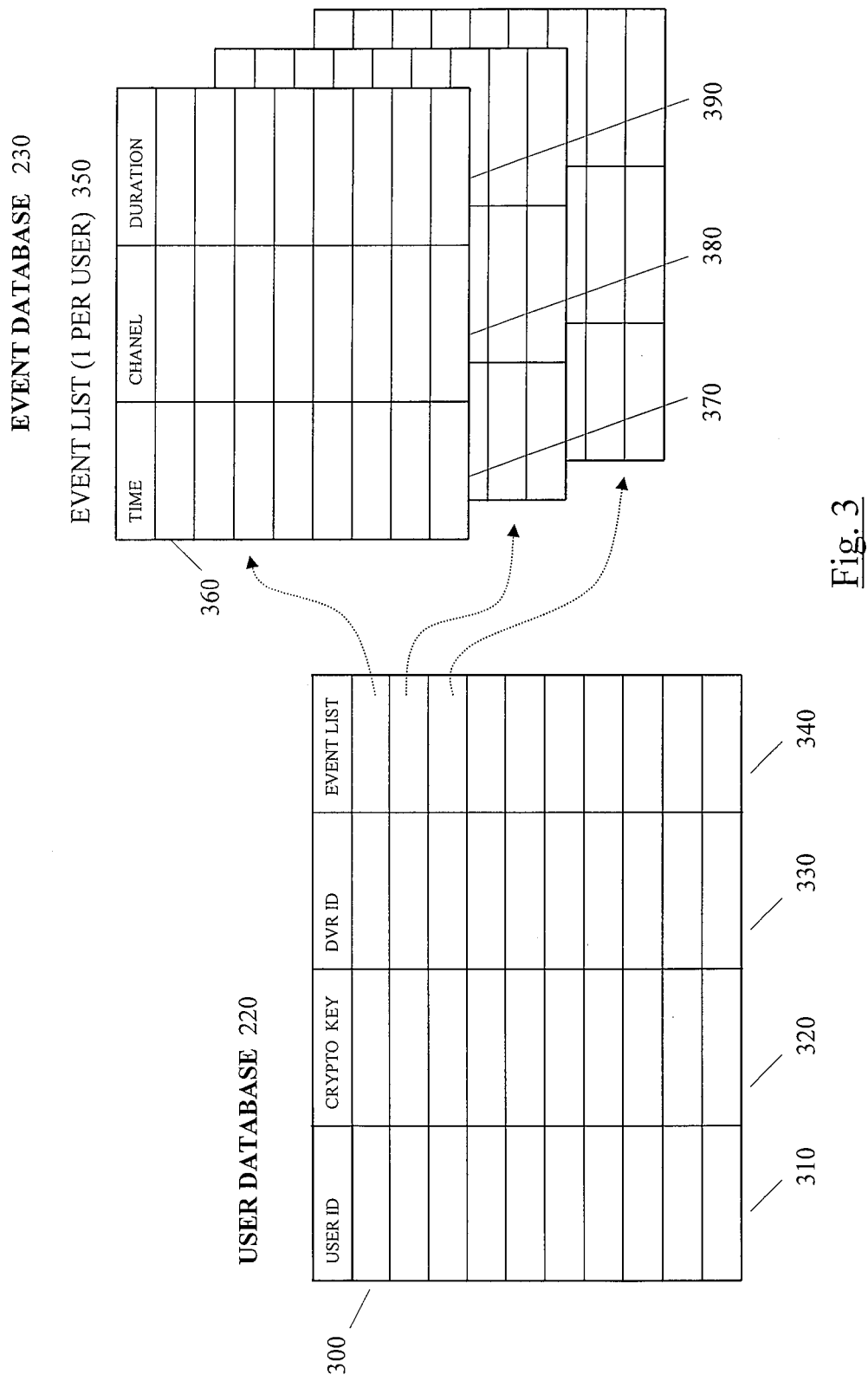
FIG. 3 is a table diagram illustrating the structures of a user database and an event database shown in FIG. 2.

FIG. 3 is a table diagram illustrating the structures of a user database 220 and an event database 230. The user database 220 includes a plurality of user records 300. Each user record 300 comprises a plurality of fields, among which are a user identification 310, a crypto-key 320, a DVR identification 330, and an event list pointer 340. The user identification field 310 is used as a key into the user database 220. The crypto-key field 320 is used to store the authorization key received from a user who is attempting to program his DVR 110 remotely. The DVR identification 330 is used to store the network address and connection details which are needed to establish a communication channel with the DVR 110.

In the user database 220, separate event lists 350 are maintained for each user. The event lists 350 are stored in the event database 230. Each event list 350 includes a plurality of event records 360. Each event record includes a plurality of fields among which are a time field 370, a channel field 380, and a duration field 390. The time field 370 is used to indicate a start time for recording and is comprised of the date and time of the program event. The channel field 380 specifies which channel the DVR should record. The duration field 390 is used to specify how long the DVR should record the content for that program event.

B. Process for Remote Access to Personal TV Service

FIG. 2, together with FIG. 1, shows various processes that collectively enable the functionality of the invention.

The service center 130 receives program schedule information 150 from external sources on a periodic basis. Once the program schedule information 150 arrives, the program database 210 is updated accordingly.

The DVR 110 updates its local program guide 260 on a periodic basis by reading a Web page from the Web server 200. In response to a request from the DVR 110, the Web server 200 first consults the program database 210 for updated program information and then dynamically creates a Web page containing updated program schedule information.

Figure 5:
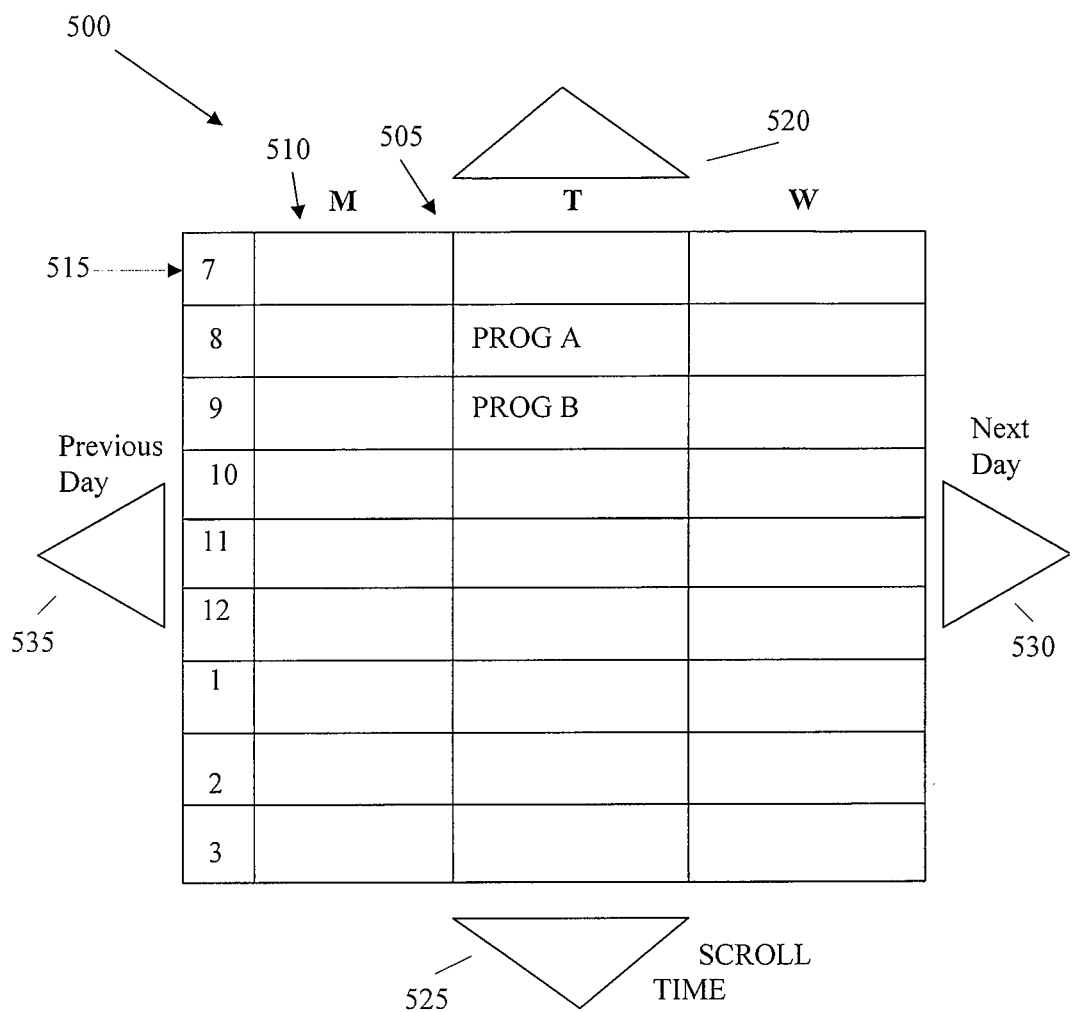
FIG. 5 is a pictorial representation of a graphical user interface for program selection.

Once the DVR 110 has updated the local program guide 260, the Web server 200 presents to a TV viewer a program guide using a graphical user interface as shown in FIG. 5. The TV viewer selects TV programs by program title and time slot to indicate what programs should be recorded by the DVR 110.

The TV viewer can remotely program the DVR 110 by using a Web browser 290 on either a remote computer 155 or a personal digital assistant 160. In this situation, the Web browser 290 is used to access a special Web site hosted by the Web server 200.

To use the remote access feature, a user must first obtain an authorization key from the DVR 110, which is generated by the pseudo-random-number-generator (PRNG) 280. The DVR 110 presents the authorization key to the user on a graphical user interface that is managed by the DVR 110.

Whenever remote access is received from the dispatch process 240, the authorization key is stored locally in the DVR 110.

The service center 130 executes a dispatch process 240 on a periodic basis. The dispatch process 240 traverses the user database 220. Whenever the dispatch process 240 encounters a user who has specified program events, the dispatch process 240 retrieves the event list 350 from the event database 230. The dispatch process 240 then establishes a communication channel with the micro-server 250 that resides in the DVR 110. This communication channel is designed to allow the dispatch process 240 to retrieve a special event-dispatch Web page from the micro-server 250. The micro-server 250 presents the event-dispatch Web page to the dispatch process 240. The dispatch process 240 then completes the event-dispatch Web page and submits it back to the micro-server 250.

The micro-server 250 uses event directives found in the event-dispatch Web page to update the event queue 270 integral to the DVR 110. The event queue 270 is a data structure used by the DVR 110 to initiate recording sessions that capture TV program events.

In order to authenticate a transaction, the Web server 200 includes one or more authorization codes for the user affiliated with the DVR 110 to be programmed. The DVR 110 compares the authorization code against a private copy maintained in the DVR's non-volatile memory. The authorization codes are time sensitive and can be set to expire as system security requirements dictate.

C. Process to Obtain Remote Programming Directives

Figure 4:
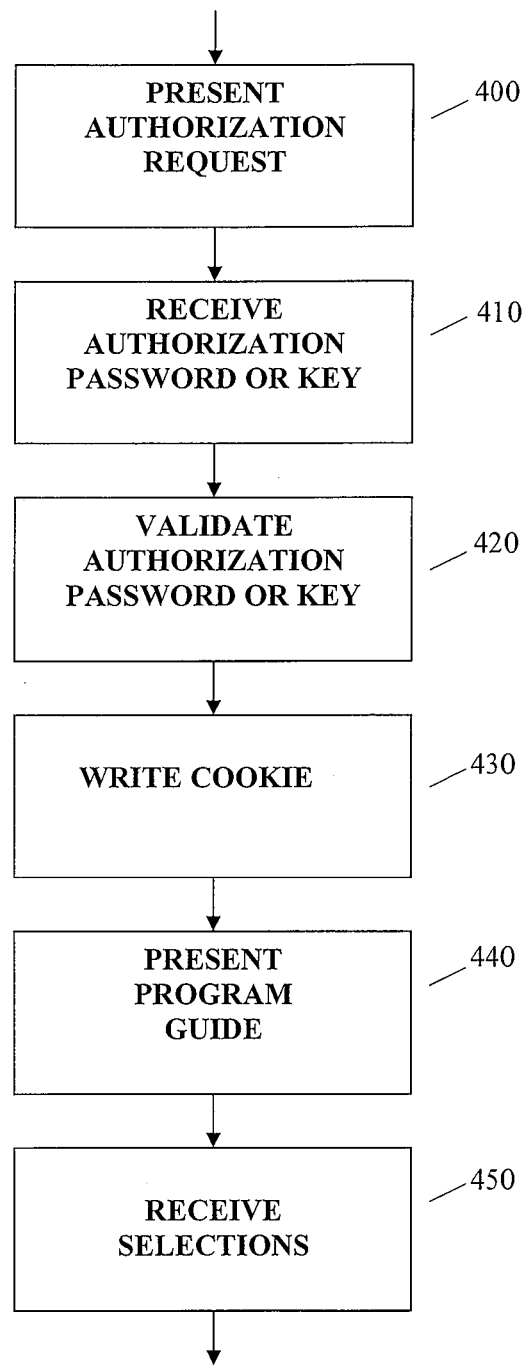
FIG. 4 is a flow chart showing a process used by a personal TV service's Web server to obtain remote programming directives from a user.

FIG. 4 is a flow chart showing a process used by the Web server 200 to obtain remote programming directives from a user. The process includes the steps of:

Step 400: The Web server 200 presents an authorization request form in the first Web page to the user who accesses a special Web site that is managed by the Web server 200;

Step 410: The Web server 200 receives the authorization key that is entered by the user who responds to the authorization request and uses the authorization key to authenticate any subsequent programming commands transmitted to the user's DVR 110;

Step 420: The Web server 200 stores the authorization key together with a user identification in the user database 220;

Step 430: Once the Web server 200 has stored the authorization key in the user database 220, it writes a cookie in the non-volatile memory of the remote computer 155 or personal digital assistant 160;

Step 440: The Web server 200 presents a program guide to the user after the user is identified and authenticated;

Step 450: The Web server 200 receives the user selections and creates an event list 350 specific to the user. The event list 350 is stored in the event database 230.

In Step 440, the Web server 200 follows a script integral to the first Web site presented to the user and searches for a valid cookie on the remote computer 155 or the personal digital assistant 160. Once a valid cookie is discovered, steps 400 through 430 are excluded from the process flow.

D. Graphical User Interface for Program Selection

Figure 6:
FIG. 6 is a screen capture of a Now Showing Web page that appears in a user's web browser.

FIG. 5 is a pictorial representation of an exemplary graphical user interface (GUI) 500 for program selection. The GUI 500 is used both on the DVR front panel and is incorporated into the Web pages presented to remote users by the Web server 200. When implemented directly in the DVR 110, the GUI 500 is manipulated directly by the control process integral to the DVR 110. When the GUI 500 is presented to the remote users via a computer network, it embodies as an active server Web page. FIG. 6 is a screen capture of the Now Showing Web page that appears in a user's web browser.

The GUI 500 comprises a table 505 that contains a plurality of columns 510 and a plurality of rows 515. The columns 510 correspond to the days of the week (and a specific calendar date). The rows 515 correspond to the hours of a given day. The columns 510 and rows 515 of the table 505 are actually made up of data selection controls where the caption of the control is set to indicate the title of a TV program that is scheduled in the time slot according to the position of that control in the table 505. The GUI also comprises a mechanism for scrolling up 520 and scrolling down 525, a mechanism for turning forward 530 and turning backward 535; a mechanism for selecting a specific TV program; a mechanism for creating a program event list 350 which contains selected TV programs; and a mechanism for editing said event list 350. In addition, it may also include a mechanism for commanding download, a mechanism for indicating the download is in progress, and a mechanism for canceling the ongoing download.

The position of the control corresponds to the day and hour of the TV program event. The user can toggle the selection controls that are presented in the GUI 500. When the GUI 500 is returned to the Web server 200, the identifiers of the selected controls are used in conjunction with the program guide 260 to create an event list 350 for the user. The event list 350 is then stored in the event database 230 in the case of remote programming. For local programming of the DVR 110, the event list 350 is stored directly in the event queue 270 that controls the DVR recording sequence.

E. Internet Access to Digital Video Recorder

Figure 7:
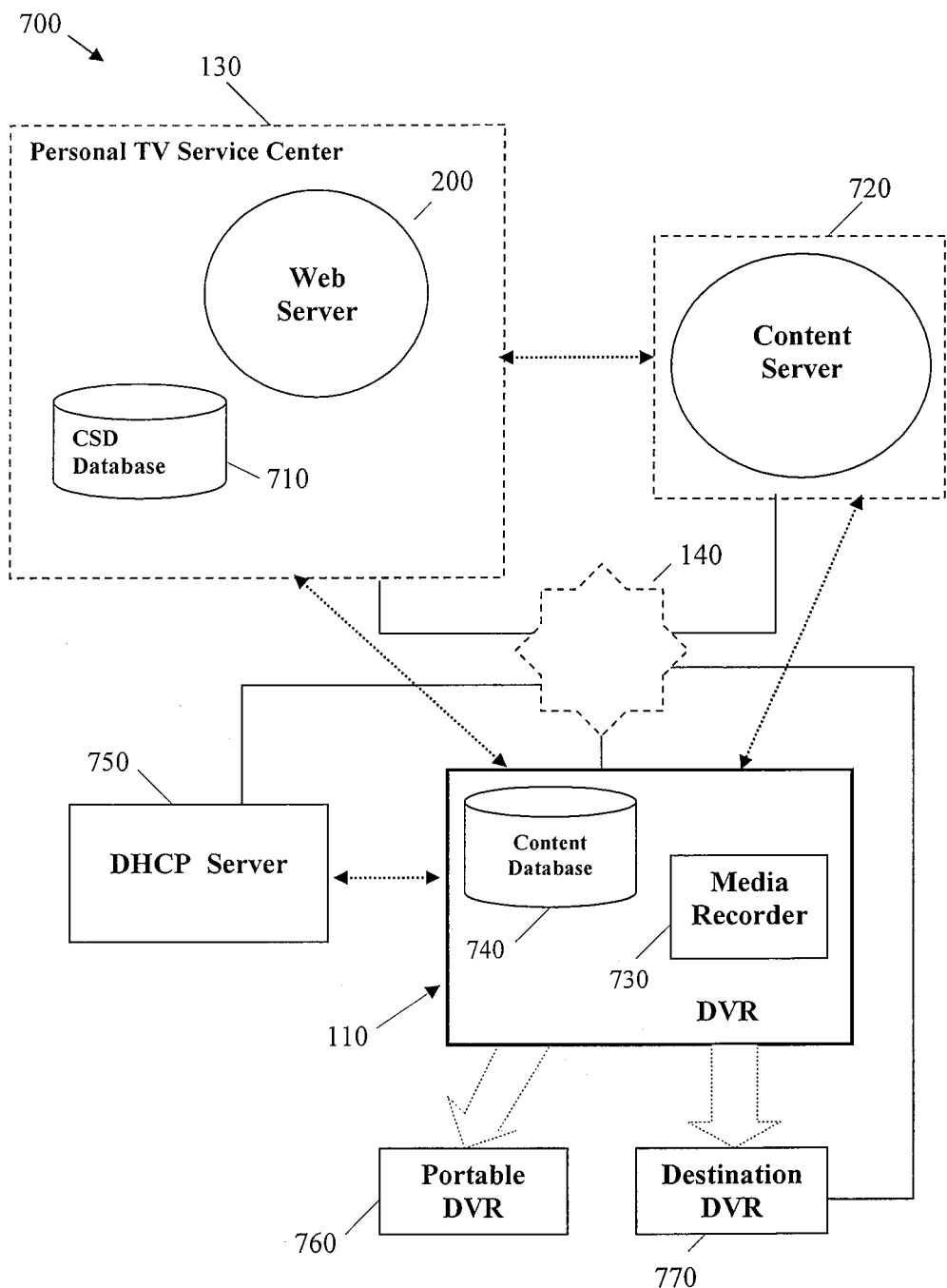
FIG. 7 is a block diagram illustrating the interactions among the personal TV service center, the DVR, and the external content server over Internet.

FIG. 7 is a block diagram of a general scheme 700 illustrating the interactions among the service center 130, the DVR 110, and the external content server 720 over the Internet, wherein a particular style of the Internet access is integrated into the DVR 110 to enable it to fetch certain types of content over an Internet connection 140 and make them available for viewing in the Now Showing page as shown in FIG. 6.

A listing of the content name, i.e., the title of TV program, indicates that such content is being fetched on the GUI 500, and a record icon, or some variant thereof, indicates that the download is in progress. The viewer may pick the content (i.e., the TV program) and play it at any time.

Figure 8:
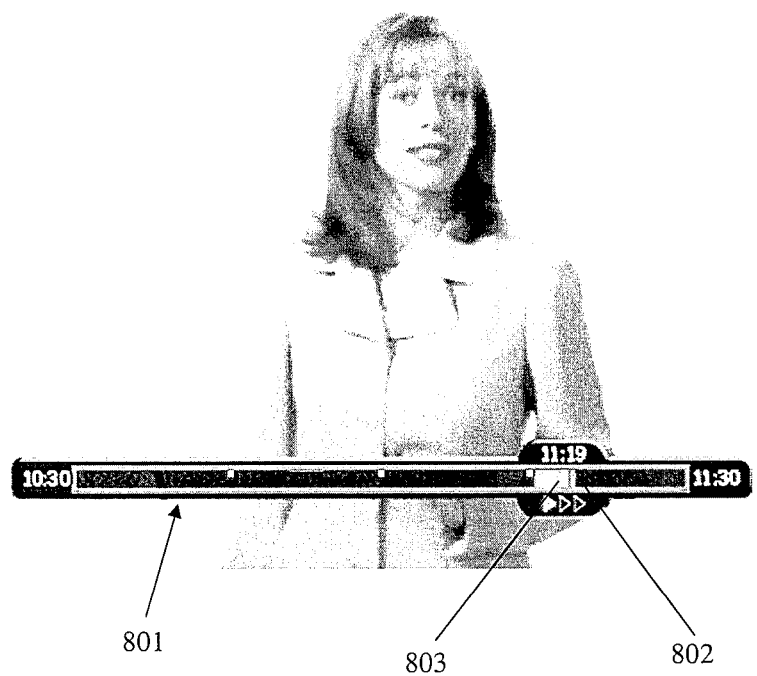
FIG. 8 is a screen capture of a replay bar indicating that the content is downloading faster than playback speed.

The download may occur at any speed, i.e., the interface 125 in FIG. 1 is not dependent in any way on speed of download. FIG. 8 is a screen capture of the Web page showing a replay bar that, by growing the green region to match, indicates that the content is downloading faster than playback speed. In any case, the viewer is able to use all trick-play actions on whatever amount of content has been downloaded to that point.

The fact that the content was downloaded over the Internet is totally transparent to the viewer, except in the context of presenting program information, where an indication that the content is from the Internet may be made in various ways.

Pointers to downloaded content are stored in a local content database 740 on the DPR 110 hard drive in an analogous manner to how broadcast programs are stored, such that all forms of searching and presentation properly display those programs and provide for their manipulation.

In channel or network oriented contexts, downloadable programs are presented in a manner analogous to broadcast programming. These contexts may have to be modified such that the channel or network "lineup" is presented in a sensible manner, since time and location are irrelevant for such programs.

The number of content items available in the Now Showing context as shown in FIG. 6 may make navigation unwieldy. Although not required for the initial implementation, this context may be modified to make navigation of many items simpler.

The entity providing the content from some servers may be viewed as a television network. Each unique server name indicates a channel. Here, a "server" is just a name on the network; it might map into just about any physical server anywhere in the world.

Once the content server 720 is contacted, the DVR 110 requests the media content according to the program identification given. This is mapped by the Web server 200 into a particular piece of content, which is then sent down the connection. Either end may throttle the download speed.

If the viewer requests multiple downloads, the DVR 110 may choose several different ways to get the content; it may initiate multiple connections with a maximum limitation, or queue requests, or both.

A primary focus is security of the DVR 110. Opening up a network port leads to a large number of possible security breaches, revolving around the security of copyrighted content and protection of a customer's private data.

A standard Linux firewall support is used to manage this protection by automatically blocking access to all but a single, well-known port in both directions. This single, well-known port is used by the application software to contact the external content server 720 for downloading media content. No connections to this port from the outside world is accepted.

A Linux DHCP client in the DVR 110 shall be ported. On boot up, if a network interface is detected, then the DHCP client uses the well-known port to poll for an external DHCP server 750. If no server is found, networking will be disabled. Otherwise, the DVR 110 will initialize its network parameters from the DHCP response.

The disadvantage of this Linux firewall support is that the external DHCP server 750 is required to configure the Internet access information. This raises the possibility of aliasing. To defeat attacks of this nature, all communication with the content server 720 must be both authenticated and encrypted. The content server 720 must have access to the public key of the DVR 110, and the DVR must have a copy of the public key of the content server 720. Using a certificate exchange, the DVR 110 and the content server 720 generate a one-time session key for the Blowfish protocol, and all further communication are encrypted. The public key of the content server 720 is distributed from the service center 130, which has also provided appropriate program guide references to the content server 720.

The service center 130 accepts descriptions of the content server 720 consisting of server URLs, content descriptions, content identifications, "channel" descriptions, "network" descriptions, etc. These data are imported into a content servers description (CSD) database 710 and sliced out as appropriate. A set of public keys for access to the content server 720 are also provided.

In order for the content server 720 to accept a connection from the DVR 110, it must have access to the public key for a particular DVR. This key distribution is performed on-the-fly. Each content server uses an authenticated connection to the service center 130 to perform key lookup. Given a DVR serial number, the service center 130 returns its public key. The content server 720 may cache this public key if so desired. The service center 130 maintains a log of all distributed public keys.

The service center 130 may refuse to provide the public key of an inactive DVR. Additionally, the content server 720 is required to respond to key invalidation requests from the service center 130, for instance, if a particular DVR becomes inactive.

A media recorder 730 is a subsystem of the personal TV service application. It allows for simultaneous record and playback of the downloading content. The recorded content is stored in the content database 740. The media recorder 730 will not be started if no permanent network connection is available. There are a number of different threads within this subsystem.

(1) Recording Queue Thread: This thread manages the queue of network download requests and implements the download policy. Initially, this may be a simple FIFO queue maintained in the object store. A recording queue policy object is maintained once the download policy is implemented.

(2) Fetch Recording Thread: This thread is responsible for managing a connection with the content server 720. It contacts the server, implements the authentication protocol, requests the desired content, and manages its download.

As a variation on this strategy, the program object may indicate multiple servers to be polled for the media content. The servers are polled in order; the first to accept a request for download is used. This provides for load-balancing.

The thread periodically checkpoints its state to the object store. This allows restart of a download after a power failure or system error. The thread also manages the state of database objects that are used for presentation and navigation of the content being downloaded; for example, it manages the state of the recording object for proper display in the Now Showing context as shown in FIG. 6. There may be one or more such threads active at any point in time.

F. DVR to DVR Interactions

A mechanism for transferring media and database elements between two DVRs is developed. Referring to FIG. 7, one example of the transfer is that a smaller amount of disk storage in a battery-driven device is provided in a portable DVR 760. Before going on vacation, a user may transfer desirable media and the invisible associated service data to the portable DVR 760 and take the portable DVR 760 along such that the media may be used when desired. Another example of the transfer is that two DVRs 110 and 770 are slaved together such that two media streams are played with precise synchronization to achieve identical operation.

There are many ways to connect two DVRs. The simplest one is to plug the output of the source DVR 110 into the input of the destination DVR 770. While it is functional, this method fails to transfer information about the media stream, which is essential to viewer satisfaction in managing and using the media stream.

The media stream stored in the DVR 110 consists of two pieces: the media content itself, and a database object which gives descriptive information about the media content. If a data transfer method is used, such as a network (e.g., IEEE 802.3) or a direct connection (e.g., IEEE 1394), then both the media content and the descriptive information can be transferred, such that the integrity of the viewer experience is preserved.

Content owners are concerned about theft of content. A further refinement of this method is to encrypt the data transfer between the DVRs 110 and 770. This can be done in a number of standard and custom ways. For instance, the Diffie-Hellman secure connection protocol may be used to encrypt the transfer using a one-time key.

If it is desirable to allow the transfer to only occur to certain specified DVRs, the integrated security system may be used. The public key of each DVR must be known to the other. When the transfer is started, the DVRs exchange signed, encrypted certificates based on the stored private key. If both DVRs can decrypt and verify the signature of the other, a one-time session key is then used to encrypt the data during the transfer.

Key distribution in such a case may be handled through the service center 130. A viewer may contact the service center 130, and request that two DVRs 110 and 770 he owns be authorized for data transfer between each other. The service center 130 sends an authorization object containing each DVR's public key to the other DVR through an appropriate download mechanism. The service center 130 maintains a record of this operation for later auditing purposes, which includes identifying information for each DVR. For instance, should the security system be defeated in one DVR and the public key of the other be exposed, it is possible to modify other DVRs such that they appear authorized to the source DVR 110. Each DVR keeps a record of the transfers. This record is uploaded to the service center 130. Later, this information could be processed to look for copy protection violations, copies to unauthorized DVRs, etc.

If the transfer is interrupted, the destination DVR 770 marks the media stream as "partial" in the descriptive object. Later, the transfer may be restarted. Since the design of the database system guarantees the media stream can be uniquely identified on the destination DVR 770, the partial stream is found, and the transfer begins from its end, thus avoiding re-transfer of media that has already been stored. Once the entire media stream is stored, the descriptive object is updated to show a complete media stream.

There is no particular real-time requirement necessary when transferring digital data between the DVRs. The transfer may take place at whatever speed is appropriate. For instance, it may be the case that the network between the DVRs is slow, in which case the transfer duration will be longer than the playback duration of the content. Alternatively, the network may be fast, in which case multiple media streams might be transferred in much less time than taken for playback of one content item. The viewer on the destination DVR may start viewing the media stream as soon as the first portions are available, in parallel with the ongoing download of the stream.

There is no requirement that the source or destination DVR be a complete digital video DVR. For instance, the media streams stored on a server in a cable head end may be transferred reliably to the destination DVR 770. Alternatively, the media stream stored in the source DVR 110 may be transferred to a head-end server.

Certain media distribution architectures, such as digital satellite systems, broadcast most media content in an encrypted state. Using a local decryption facility based on a smart-card, the media content is decrypted only if it is viewed, thus protecting the content from theft. It is possible for the DVR to save these encrypted media streams to disk, and to initiate decryption upon playback. This method may be used to transfer media streams between two DVRs. In order to properly comply a particular set of content protection rules associated with the media stream (such as play once, expire after one day, etc.), the DVR maintains with the database object describing the media stream the copy protection information associated with the media stream (including whether the stream is stored encrypted).

The content protection rules associated with the media stream may be transferred to the destination DVR 770 as well. For example, the DVR 110 may have stored a movie from the content server 720 that will not be decrypted until it is viewed. If the viewer wishes to have this media stream transferred, it is simply copied into the media region of the destination DVR 770, and the descriptive object is transferred as well. This means that the original information on the media stream is faithfully duplicated to the destination DVR 770.

The smart-card might be pulled from the source DVR 110 and installed in the destination DVR 770. When the media content is viewed, the viewer is properly charged and all copy protection rules followed. The original media content and descriptive information might, or might not, be removed. For instance, in a "view-once" scheme, the originals are destroyed, whereas in a "charge-per-view" scheme, they would not.

Using the same techniques as described above, a secure, or authenticated and secure, connection may be established between two or more DVRs using a network, perhaps accessed using the internal modem. This enables control interactions to take place. Some examples are:

(1) Synchronized playback. A viewer may control trick-play features on a particular media stream. Each key event is also passed to the destination DVR 770, which automatically performs the same action. For example, a presenter may give a live presentation using the source DVR 110 as a multimedia playback device, and an audience at a remote location can watch the same presentation given in the same way at the same time. Alternatively, two viewers communicating through some other means, such as a telephone, may interact, while one or the other controls the playback on both DVRs of the same program. This allows precise discussion of the program of interest. The means of communication may be a simple chat program overlayed on the display in which the participants type comments.

(2) Link passing. A viewer of the source DVR 110 may indicate that a particular program be linked to the destination DVR 770. This results in a message sent to the destination DVR 770 which causes it to schedule recording of that program. Alternately, the program may be unlinked as well. The message needs to contain only the program identification, assuming both DVRs 110 and 770 are in service.

(3) Sound or graphics effects. When the viewer takes an action, such as pressing a particular key sequence, the source DVR 110 may play a sound or present a graphic. It may pass that event to the destination DVR 770 which reproduces that same sound or graphic. For instance, a child may add sounds to a program this way, which may be replicated for his friend on a remote destination DVR 770. Clearly, such communication may be multi-way.

It may be useful for DVRs to be able to transfer other types of data as well. For example, consider a large home DVR 110 and a smaller portable DVR 760. Interesting data, such as software, graphical elements, program guide data, etc., might be transferred between two DVRs as well. For instance, the portable DVR 760 may be updated by the home DVR 110 every time the two DVRs are connected. This update includes transferring and installing a software update as well. The portable DVR 760 transfers any operational information to the home DVR 110 whenever two DVRs are connected, and the home DVR 110 then sends the operational information to the service center 130 whenever the home DVR 110 accesses to the service center 130.

The update may be done automatically. In such a case, when two DVRs are connected, a set of pre-configured actions takes place, such as updating program guide or software, and then media streams may be transferred as well. If the destination DVR 770 is a smaller portable unit, then not all media streams would fit. In this case, the viewer may explicitly choose which media streams to transfer. A more interesting case occurs if preference information is used to choose a subset of the available media of most interest to the viewer and transfer only those streams. Another case is where media streams are transferred going from newest to oldest, stopping when no more will fit, or oldest to newest, which is less interesting. Another criteria may be whether the program was explicitly picked or chosen based on viewer preferences. Any program information stored in the descriptive object for the content may be used in the selection criteria, such as length, actors, rating, etc.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

What is claimed is:

1. A method comprising:
   at a media receiver, receiving input indicating criteria for choosing one or more media streams to transfer from the media receiver to a portable media playback device, the criteria explicitly selecting the one or more media streams;
   after receiving the input, upon connection of the media receiver and the portable media playback device:
      based on the criteria, automatically choosing, from a plurality of media streams stored at the media receiver, at least one explicitly selected media stream to transfer to the portable media playback device; and
      automatically transferring the chosen at least one media stream from the media receiver to the portable media playback device.

2. The method of claim 1, wherein receiving the input comprises receiving an explicit choice of the at least one media stream from a user.

3. The method of claim 1, wherein the criteria is based on user preferences.

4. The method of claim 1, wherein choosing the at least one media stream based on the criteria comprises comparing content information specified in the criteria to program information specified for the plurality of media streams.

5. The method of claim 1, wherein the criteria specifies a title or a description of the at least one media stream.

6. The method of claim 1, wherein choosing the at least one media stream based on the criteria comprises comparing content information specified in the criteria to descriptive information specifying content lengths for the plurality of media streams.

7. The method of claim 1, wherein choosing the at least one media stream based on the criteria comprises comparing content information specified in the criteria to descriptive information specifying ratings for the plurality of media streams.

8. The method of claim 1, further comprising the media receiver downloading one or more of the at least one media stream from another device.

9. The method of claim 1, further comprising the media receiver recording one or more of the at least one media stream from a broadcast source.

10. The method of claim 1, wherein the media receiver is a server to which the portable media playback device connects over a network.

11. The method of claim 1, wherein the media receiver is a server at a cable head end.

12. The method of claim 1, wherein the media receiver is a digital video recorder.

13. The method of claim 1, wherein the connection is a network connection facilitated by a service center.

14. The method of claim 1, wherein the connection is established by a user plugging the portable media playback device into the media receiver.

15. The method of claim 1, wherein the connection is an encrypted connection.

16. The method of claim 1, wherein the portable media playback device is a battery driven device that operates independent of the media receiver.

17. The method of claim 1, wherein the portable media playback device is configured to play back at least a particular media stream selected by a user via a user interface on the portable media playback device, from the at least one media stream.

18. The method of claim 1, wherein transferring the at least one media stream comprises causing the portable media playback device to store the at least one media stream in one or more storage devices at the portable media playback device.

19. The method of claim 1, further comprising automatically transferring, with the at least one media stream, descriptive information about the at least one media stream.

20. The method of claim 1, further comprising automatically transferring, with the at least one media stream, rules that cause the portable media playback device to enforce a copy protection scheme with respect to the at least one media stream.

21. The method of claim 1, further comprising, upon a subsequent connection of the media receiver and the portable media playback device, the media receiver receiving operational information from the portable media playback device.

22. The method of claim 21, further comprising the media receiver transferring the operational information to a server.

23. The method of claim 1, wherein the media stream is encrypted.

24. The method of claim 1, further comprising:
   at the media receiver maintaining a content database that describes the plurality of media streams, including the at least one media stream, wherein the content database includes the content information to which the criteria is compared;
   wherein automatically choosing the at least one media stream comprises selecting which of the plurality of media streams described in the content database are to be transferred to the portable media playback device based on the criteria.

25. One or more non-transitory computer-readable media comprising instructions that, when executed by one or more computing devices, cause:
   at a media receiver, receiving input indicating criteria for choosing one or more media streams to transfer from the media receiver to a portable media playback device, the criteria explicitly selecting the one or more media streams;
   after receiving the input, upon connection of the media receiver and the portable media playback device:
      based on the criteria, automatically choosing, from a plurality of media streams stored at the media receiver, at least one explicitly selected media stream to transfer to the portable media playback device; and
      automatically transferring the chosen at least one media stream from the media receiver to the portable media playback device.

26. The one or more non-transitory computer-readable media of claim 25, wherein receiving the input comprises receiving an explicit choice of the at least one media stream from a user.

27. The one or more non-transitory computer-readable media of claim 25, wherein the criteria is based on user preferences.

28. The one or more non-transitory computer-readable media of claim 25, wherein choosing the at least one media stream based on the criteria comprises comparing content information specified in the criteria to program information specified for the plurality of media streams.

29. The one or more non-transitory computer-readable media of claim 25, wherein the criteria specifies a title or a description of the at least one media stream.

30. The one or more non-transitory computer-readable media of claim 25, wherein choosing the at least one media stream based on the criteria comprises comparing content information specified in the criteria to descriptive information specifying content lengths for the plurality of media streams.

31. The one or more non-transitory computer-readable media of claim 25, wherein choosing the at least one media stream based on the criteria comprises comparing content information specified in the criteria to descriptive information specifying ratings for the plurality of media streams.

32. The one or more non-transitory computer-readable media of claim 25, wherein the instructions, when executed by the one or more computing devices, further cause the media receiver downloading one or more of the at least one media stream from another device.

33. The one or more non-transitory computer-readable media of claim 25, wherein the instructions, when executed by the one or more computing devices, further cause the media receiver recording one or more of the at least one media stream from a broadcast source.

34. The one or more non-transitory computer-readable media of claim 25, wherein the media receiver is a server to which the portable media playback device connects over a network.

35. The one or more non-transitory computer-readable media of claim 25, wherein the media receiver is a server at a cable head end.

36. The one or more non-transitory computer-readable media of claim 25, wherein the media receiver is a digital video recorder.

37. The one or more non-transitory computer-readable media of claim 25, wherein the connection is a network connection facilitated by a service center.

38. The one or more non-transitory computer-readable media of claim 25, wherein the connection is established by a user plugging the portable media playback device into the media receiver.

39. The one or more non-transitory computer-readable media of claim 25, wherein the connection is an encrypted connection.

40. The one or more non-transitory computer-readable media of claim 25, wherein the portable media playback device is a battery driven device that operates independent of the media receiver.

41. The one or more non-transitory computer-readable media of claim 25, wherein the portable media playback device is configured to play back at least a particular media stream selected by a user via a user interface on the portable media playback device, from the at least one media stream.

42. The one or more non-transitory computer-readable media of claim 25, wherein transferring the at least one media stream comprises causing the portable media playback device to store the at least one media stream in one or more storage devices at the portable media playback device.

43. The one or more non-transitory computer-readable media of claim 25, wherein the instructions, when executed by the one or more computing devices, further cause automatically transferring, with the at least one media stream, descriptive information about the at least one media stream.

44. The one or more non-transitory computer-readable media of claim 25, wherein the instructions, when executed by the one or more computing devices, further cause automatically transferring, with the at least one media stream, rules that cause the portable media playback device to enforce a copy protection scheme with respect to the at least one media stream.

45. The one or more non-transitory computer-readable media of claim 25, wherein the instructions, when executed by the one or more computing devices, further cause, upon a subsequent connection of the media receiver and the portable media playback device, the media receiver receiving operational information from the portable media playback device.

46. The one or more non-transitory computer-readable media of claim 45, wherein the instructions, when executed by the one or more computing devices, further cause the media receiver transferring the operational information to a server.

47. The one or more non-transitory computer-readable media of claim 25, wherein the media stream is encrypted.

48. The one or more non-transitory computer-readable media of claim 25, wherein the instructions, when executed by the one or more computing devices, further cause:
  at the media receiver maintaining a content database that describes the plurality of media streams, including the at least one media stream, wherein the content database includes the content information to which the criteria is compared;
  wherein automatically choosing the at least one media stream comprises selecting which of the plurality of media streams described in the content database are to be transferred to the portable media playback device based on the criteria.

49. An apparatus comprising:
  a subsystem, implemented at least partially by hardware, that receives input indicating criteria for choosing one or more media streams to transfer from the media receiver to a portable media playback device, the criteria explicitly selecting the one or more media streams;
  a subsystem, implemented at least partially by hardware, that, after receiving the input, upon connection of the apparatus and the portable media playback device:
    based on the criteria, automatically chooses, from a plurality of media streams stored at the media receiver, at least one explicitly selected media stream to transfer to the portable media playback device; and
    automatically transfers the chosen at least one media stream from the apparatus to the portable media playback device.

50. The apparatus of claim 49, wherein receiving the input comprises receiving an explicit choice of the at least one media stream from a user.

51. The apparatus of claim 49, wherein the criteria is based on user preferences.

52. The apparatus of claim 49, wherein choosing the at least one media stream based on the criteria comprises comparing content information specified in the criteria to program information specified for the plurality of media streams.

53. The apparatus of claim 49, wherein the criteria specifies a title or a description of the at least one media stream.

54. The apparatus of claim 49, wherein choosing the at least one media stream based on the criteria comprises comparing content information specified in the criteria to descriptive information specifying content lengths for the plurality of media streams.

55. The apparatus of claim 49, wherein choosing the at least one media stream based on the criteria comprises comparing content information specified in the criteria to descriptive information specifying ratings for the plurality of media streams.

56. The apparatus of claim 49, further comprising a subsystem, implemented at least partially by hardware, that downloads one or more of the at least one media stream from another device.

57. The apparatus of claim 49, further comprising a subsystem, implemented at least partially by hardware, that records one or more of the at least one media stream from a broadcast source.

58. The apparatus of claim 49, wherein the apparatus is a server to which the portable media playback device connects over a network.

59. The apparatus of claim 49, wherein the apparatus is a server at a cable head end.

60. The apparatus of claim 49, wherein the apparatus is a digital video recorder.

61. The apparatus of claim 49, wherein the connection is a network connection facilitated by a service center.

62. The apparatus of claim 49, wherein the connection is established by a user plugging the portable media playback device into the apparatus.

63. The apparatus of claim 49, wherein the connection is an encrypted connection.

64. The apparatus of claim 49, wherein the portable media playback device is a battery driven device that operates independent of the apparatus.

65. The apparatus of claim 49, wherein the portable media playback device is configured to play back at least a particular media stream selected by a user via a user interface on the portable media playback device, from the at least one media stream.

66. The apparatus of claim 49, wherein transferring the at least one media stream comprises causing the portable media playback device to store the at least one media stream in one or more storage devices at the portable media playback device.

67. The apparatus of claim 49, further comprising a subsystem, implemented at least partially by hardware, that automatically transfers, with the at least one media stream, descriptive information about the at least one media stream.

68. The apparatus of claim 49, further comprising a subsystem, implemented at least partially by hardware, that automatically transfers, with the at least one media stream, rules that cause the portable media playback device to enforce a copy protection scheme with respect to the at least one media stream.

69. The apparatus of claim 49, further comprising a subsystem, implemented at least partially by hardware, that, upon a subsequent connection of the apparatus and the portable media playback device, receives operational information from the portable media playback device.

70. The apparatus of claim 69, further comprising a subsystem, implemented at least partially by hardware, that transfers the operational information to a server.

71. The apparatus of claim 49, wherein the media stream is encrypted.

72. The apparatus of claim 49, further comprising:
a subsystem, implemented at least partially by hardware, that: at the media receiver, maintains a content database that describes the plurality of media streams, including the at least one media stream, wherein the content database includes the content information to which the criteria is compared;
wherein automatically choosing the at least one media stream comprises selecting which of the plurality of media streams described in the content database are to be transferred to the portable media playback device based on the criteria.

73. A method comprising:
upon connection of a media receiver and a portable media playback device, automatically transferring media content from the media receiver to the portable media playback device, the media content having been explicitly picked prior to the connection at the media receiver from media content available to the media receiver, the portable media playback device being a battery driven device that operates independent of the media receiver;
causing the media content transferred from the media receiver to be stored on one or more storage devices at the portable media playback device, the portable media playback device being configured to present at least particular media content selected via an interface on the portable media playback device, from the media content stored on the one or more storage devices at the portable media playback device and transferred from the media receiver.

74. One or more non-transitory computer-readable media storing instructions that, when executed by one or more computing devices, cause performance of:
upon connection of a media receiver and a portable media playback device, automatically transferring media content from the media receiver to the portable media playback device, the media content having been explicitly picked prior to the connection at the media receiver from media content available to the media receiver, the portable media playback device being a battery driven device that operates independent of the media receiver;
causing the media content transferred from the media receiver to be stored on one or more storage devices at the portable media playback device, the portable media playback device being configured to present at least particular media content selected via an interface on the portable media playback device, from the media content stored on the one or more storage devices at the portable media playback device and transferred from the media receiver.

75. An apparatus comprising:
a subsystem, implemented at least partially by hardware, that, upon connection of a media receiver and a portable media playback device, automatically transfers media content from the media receiver to the portable media playback device, the media content having been explicitly picked prior to the connection at the media receiver from media content available to the media receiver, the portable media playback device being a battery driven device that operates independent of the media receiver;
a subsystem, implemented at least partially by hardware, that causes the media content transferred from the media receiver to be stored on one or more storage devices at the portable media playback device, the portable media playback device being configured to present at least particular media content selected via an interface on the portable media playback device, from the media content stored on the one or more storage devices at the portable media playback device and transferred from the media receiver.

* * * * *